United States Patent [19]

Yamauchi et al.

[11] 4,261,405
[45] Apr. 14, 1981

[54] SAFETY PNEUMATIC TIRE WITH TIRE MAXIMUM WIDTH TO RIM WIDTH RATIO FROM 1.0 TO 1.3

[75] Inventors: Makoto Yamauchi, Fussa; Norio Goshima, Musashino; Kazumi Tsukahara, Tanashi, all of Japan

[73] Assignee: Bridgestone Tire Co., Ltd., Tokyo, Japan

[21] Appl. No.: 85,659

[22] Filed: Oct. 17, 1979

[30] Foreign Application Priority Data

Oct. 30, 1978 [JP] Japan .................................. 53-133560

[51] Int. Cl.$^3$ .............................................. B60C 17/00
[52] U.S. Cl. ........................ 152/330 RF; 152/353 R; 152/354 R; 152/362 R; 152/374; 152/357 R
[58] Field of Search ........ 152/330 R, 330 RF, 330 L, 152/330 C, 352 R, 352 A, 353 R, 353 C, 353 G, 354, 357, 362 R, 362 CS, 374

[56] References Cited

U.S. PATENT DOCUMENTS

| | | | |
|---|---|---|---|
| 3,911,987 | 10/1975 | Takusagawa et al. | 152/330 RF X |
| 3,935,892 | 2/1976 | Arimura et al. | 152/330 RF |
| 3,954,131 | 5/1976 | Hoshino et al. | 152/330 RF X |
| 3,994,329 | 11/1976 | Masson et al. | 152/330 RF X |
| 4,067,372 | 1/1978 | Masson | 152/361 FP X |
| 4,067,374 | 1/1978 | Alden et al. | 152/330 RF X |
| 4,139,040 | 2/1979 | Samoto et al. | 152/354 R |

*Primary Examiner*—Michael W. Ball
*Assistant Examiner*—Lois E. Boland
*Attorney, Agent, or Firm*—Sughrue, Rothwell, Mion, Zinn and Macpeak

[57] ABSTRACT

A safety pneumatic tire which can improve running distance under punctured condition comprising an annular resilient reinforcing body having a maximum thickness corresponding to 4 to 9% of the tire maximum width and a JIS hardness of at least 60° in which a ratio of the tire maximum width TW to the rim width RW is $1.0 \leq TW/RW \leq 1.3$.

6 Claims, 3 Drawing Figures

SAFETY PNEUMATIC TIRE WITH TIRE MAXIMUM WIDTH TO RIM WIDTH RATIO FROM 1.0 TO 1.3

BACKGROUND OF THE INVENTION

1. Field of the Invention

This invention relates to a safety pneumatic tire which can support the weight subjected to the wheels by means of the rigidity inherent to the tire sidewall even when the internal pressure applied to the tire is suddenly reduced to zero causing the tire to be deflated and which can continue running for a long distance without accompanied by some restriction. The safety pneumatic tire according to the invention is particularly useful for passenger cars.

2. Description of the Prior Art

Safety pneumatic tires comprising reinforced sidewalls has been well known. Heretofore, it has been common practice to increase the thickness of an annular resilient reinforcing body made integral with the sidewall of the purpose of improving a run flat characteristic of the tire, that is, increasing the running distance for a punctured condition of the tire. The use of the annular resilient reinforcing body which is large in thickness results in an increase of the weight of the tire as a whole. In addition, heat generated in the annular resilient reinforcing body frequently induces tire failures. Moreover, the rolling resistance and the tire comfortable property of the inflated tire applied with the normal internal pressure therein under the normal running condition become inferior to the ordinary tire. As a result, the thickness of the annular resilient reinforcing body could not be increased beyond a certain limit. Thus, there is a limit for improvement in the run flat characteristic of the tire with the aid of the increased thickness of the annular resilient reinforcing body.

SUMMARY OF THE INVENTION

An object of the invention, therefore, is to provide a safety pneumatic tire which can make the rolling resistance of the unflated tire with normal internal pressure applied therein under the ordinary running condition substantially equal to that of the ordinary tire and which can significantly improve the run flat characteristic of the tire, improvement has been deemed impossible by prior art safety pneumatic tires owing to the limitation of the increase of the thickness of the annular resilient reinforcing body arranged in the tire sidewall.

A feature of the invention is the provision in a safety pneumatic tire comprising at least one toroidal-shaped carcass ply composed of a rubberized cord layer, a pair of bead portions each including a bead wire around which is wound each end of said carcass ply from the inside toward the outside thereof so as to form a turn-up portion, a pair of sidewall portions each connected to each bead portion, a tread portion extending across both said sidewall portions and an annular resilient reinforcing body extending along a total curved region from a position where the thickness of said bead portion becomes thin toward said sidewall portion to a hump position where the thickness at the shoulder of said tread portion is the largest and having a maximum thickness corresponding to 4 to 9% of the tire maximum width, said annular resilient reinforcing body gradually decreasing in thickness toward both said bead portion and said hump position, but the total thickness of said annular resilient reinforcing body and said sidewall portion being substantially equal and continuous in the radial direction of the tire, said annular resilient reinforcing body having a JIS hardness of at least 60°, of an improvement in which a ratio of the tire maximum width TW of said safety pneumatic tire mounted on a wheel rim and inflated under a given internal pressure applied in the tire to the rim width RW is determined within a range given by $1.0 > TW/RW > 1.3$.

Further objects and features of the invention will be fully understood from the following detailed description with reference to the accompanying drawings, wherein:

DETAILED DESCRIPTION OF THE PREFERRED EMBODIMENTS

Figure 1:
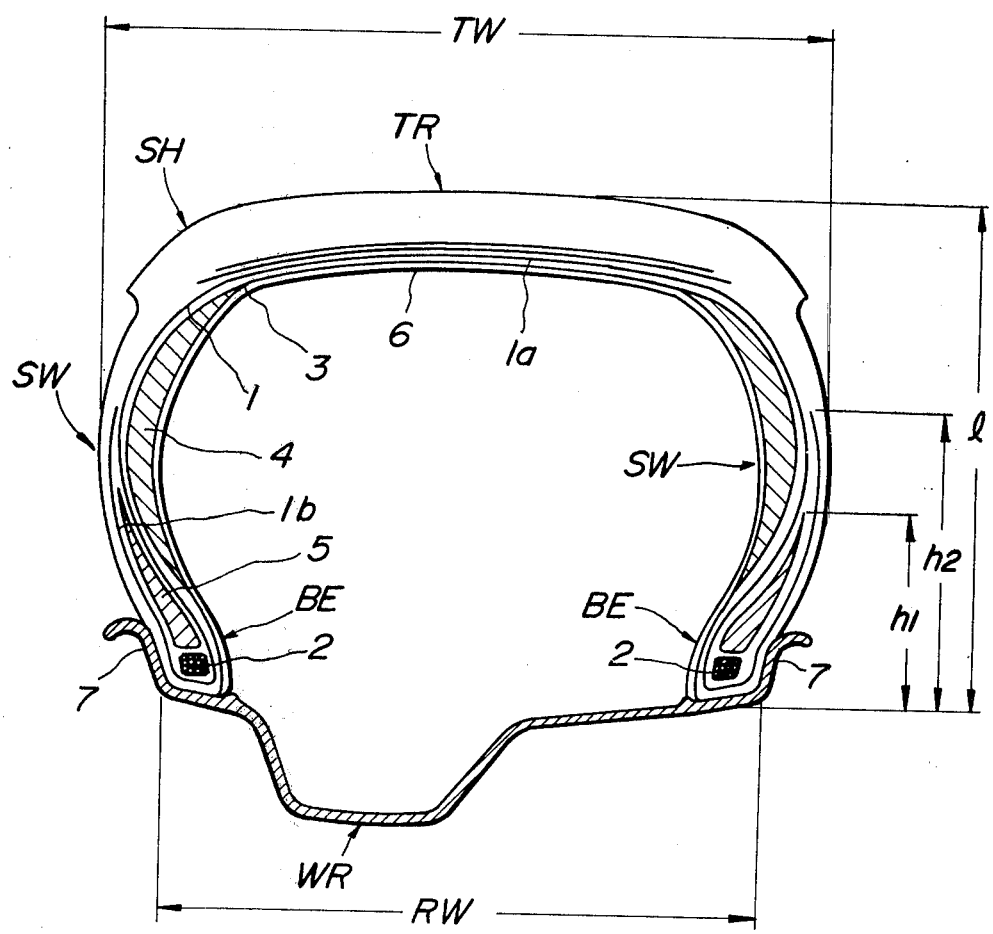
FIG. 1 is a diagrammatic cross sectional view of one embodiment of a safety pneumatic tire according to the invention.

The present invention is intended to improve the run flat characteristic which has been difficult to achieve in prior art tires owing to a limitation of the increase in thickness of the annular resilient reinforcing material incorporated into the tire sidewall portion.

The ordinary tire comprises a very flexible sidewall portion having a small bending rigidity. In such an ordinary tire, about 80% of the load subjected to the tire is supported by the pressure of air introduced into the tire. As a result, if air is removed dur to puncture, burst or the like, the sidewall portion having the small bending rigidity becomes bent and hence it is impossible to support the load subjected to the tire by the sidewall portion.

That critical load Wcr under which the above mentioned bending deformation of the sidewall portion occurs is given by, $$Wcr \propto (EI/l^2)$$

where l is a tire height and EI is a bending rigidity. As seen from the above formula, it is understood that the tire is prevented from being bent when the tire is punctured by making the bending rigidity EI large and making the tire height l small.

The bending rigidity EI may be made large by making the modulus of elasticity E large and making the sectional secondary moment I large. The modulus of elasticity E may usually be selected by the quality of the material used. In the case of tire, use may be made of a rubber-like resilient body as such material by taking the bonding ability with the surrounding rubber and the normal running ability and more particularly vibration comfortable riding property into consideration. Meanwhile, the sectional secondary moment I is a constant to be determined by the sectional configuration. If the sectional area is made large, the sectional secondary moment becomes large. As a result, in order to make the bending rigidity EI large, the rubber-like resilient reinforcing body may be made large and hence thicker. However, if the thickness of the rubber-like resilient reinforcing body is made large, the rubber-like resilient reinforcing body becomes heavy and hence generation and accumulation of heat are increased such that tire durability is degraded and the rolling resistance and vibration comfortable riding property are significantly degraded.

In the present invention, in order to provide a safety pneumatic tire which can eliminate the above mentioned drawback which has been encountered with the prior art technique, the material used is effectively combined with the tire configuration such that the radius of curvature of the sidewall portion is made as large as possible and a ratio of the tire maximum width to the rim width of the wheel rim is made as small as possible.

The tire maximum width shall be understood to mean a sectional width of the tire which is mounted on the rim and which is inflated with the air pressure charged therein. The rim width shall be understood to mean a distance between rim flanges substantially perpendicular to the rim base.

The safety pneumatic tire constructed as above must take the following conditions into consideration.

(1) In order to mount the tire bead portion on the rim flange by the air pressure, the axial component of the tension produced in the tire carcass due to the air pressure must be applied to the outside of the tire sectional surface. As a result, the ratio of the tire maximum width to the tire rim width should be at least 1.0.

(2) The thickness of the rubber-like resilient body is different depending on the rate of flatness, configuration and construction of the tire. The effect of preventing the rubber-like resilient body from being bent could not be obtained when the thickness thereof is smaller than 3% of the tire maximum width. The effect due to the configuration according to the invention can truely be obtained when the thickness of the rubber-like resilient body is at least 4% of the tire maximum width.

(3) It is preferable to make a JIS hardness of the rubber-like resilient body at least 60° for the purpose of preventing the bending deformation thereof. In addition, in order to make thermal fatigue due to generation of heat caused by repetition of severe bending deformation as small as possible, use must be made of rubber having at least 60% of resilient modulus of elasticity and generating small amounts of heat.

(4) The tire inside temperature produced under a punctured condition is high at the sidewall portion subjected to severe bending deformation and is low at the tire tread portion subjected to less bending deformation. The heat generated in the sidewall portion due to the severe bending deformation during the running of the tire is radiated into the outside air in a direction along a normal line perpendicular to the tangent to the sidewall portion on the one hand and is transmitted from the sidewall portion in section to the tread portion on the other hand. As a result, rubber having a good heat transmission property must be arranged at the tread portion and at the shoulder thereof.

(5) The tire breaks due to running under its punctured condition in the first place from the inner surface of the sidewall portion which is subjected to severe bending deformation, which generates a large amount of the heat due to concentration of strain and subjected to much mechanical fatigue, and as a result, it is preferable to use an inner liner formed of butyl rubber halide and having an excellent bend resistant property, small air transmission property and adapted to effectively prevent deterioration due to oxidation.

In addition, in order to effectively assemble together the constitutional members of the tire, it is preferable to arrange these constitutional members under the following conditions.

(1) When the tire is punctured, the tire sidewall portion extending from the bead portion up to the tread portion shoulder becomes considerably deformed. At the bead portion, the tire inner surface is subjected to a large tensile strain, while the tire outer surface is subjected to a compressive strain. Meanwhile, at the sidewall portion, the inner surface is subjected to the large compressive strain, while the tire outer surface is subjected to the tensile strain. As a result, by taking the physical property and mechanical property of the tire constitutional material into consideration, at the bead portion, it is preferable to arrange a carcass material highly resistant to the tension at the tire inside and arrange a bead filler formed of a rubber-like resilient body highly resistant to the compression at the tire outside, while at the sidewall portion, it is preferable to arrange the carcass material highly resistant to the tension at the tire outside and arrange an annular resilinet reinforcing body highly resistant to the compression at the tire inside.

(2) In addition, the carcass ply is wound around the bead wire from the inside toward the outside thereof to form its turn-up portion which is then closely adhered to the carcass ply without inserting a bead filler rubber between the carcass ply and its turn-up portion, the turn-up portion being extended from the bead portion toward the tread portion shoulder and arranged at the tension side of the bead portion and the sidewall portion.

(3) Owing to the reasons described with eference to the above paragraphs (1) and (2), it is preferable to locate the top end of the turn-up portion of the carcass ply at a position which is higher than the tire maximum width position.

The invention will now be described with reference to embodiments shown in the drawings. FIG. 1 shows one embodiment of a safety pneumatic tire according to the invention in section.

Referring to FIG. 1 BE designates a pair of bead portions, SW a pair of sidewall portions connected to respective bead portions, TR a tread portion extending across the two sidewall portions, SH a tread shoulder portion, and WR a wheel rim adapted to mount a tire thereon. In addition, TW is a maximum width of the tire inflated under a given internal pressure, l a height of the tire, and RM a width of a wheel rim.

A carcass ply 1 is composed of a rubberized cord layer, the cord being formed of nylon, polyester, rayon or the like carcass material, and consists of a main portion 1a and turn-up portions 1b, 1b. The main portion 1a is toroidally embedded into the tread portion TR and sidewall portion SW and the turn-up portions 1b, 1b are formed by winding the main portion 1a around a pair of bead wire 2 from the inside toward the outside thereof and embedded in the bead portion BE and sidewall portion SW.

In the inside of the carcass play 1 is arranged an annular resilient reinforcing body 4. The annular resilient reinforcing body 4 extends along a total curved region from a position where the thickness of the bead portion BE becomes thin toward the sidewall portion SW to a hump 3 having a thickness which is the largest at the shoulder SH of the tread portion TR. The annular resilient reinforcing body 4 is crescent moon-shaped in section and has a thickness gradually decreasing toward body the bead portion BE and the hump 3.

The annular resilient reinforcing body 4 has a maximum thickness corresponding to 4 to 9% of the maximum width W of the tire. The annular resilient reinforcing body 4 is formed of rubber having a JIS hardness of at least 60°. Between the carcass ply 1a located at the bead portion BE and the turn-up portion 1b thereof is interposed a bead filler rubber 5 formed of a hard rubber stock and gradually thinning in thickness toward the sidewall portion SW. The end portion of the annular resilient reinforcing body 4 which is located near the bead portion BE and the bead filler rubber 5 are overlapped and bonded to each other, while the other end portion of the annular resilient reinforcing body 4 is bonded through the carcass ply 1a to the tread portion TR.

The sidewall portion SW, made integral with the annular resilient reinforcing body 4, extends in the radial direction of the tire. It is substantially uniform in thickness and reinforced by the annular resilient reinforcing body 4 and the bead filler rubber 5.

The total inner peripheral surface of the tire is covered with an inner liner 6.

The tire constructed as above described and selection of the ratio of the maximum width of the tire TW to the width of the rim RW to at least 1, that is, $TW/RW \geq 1$ render it possible to urge the bead portion BE against the rim flange 7 and secure and hermetic seal the former to the latter.

In FIG. 1, $h_1$ designates a height of that end of the bead filler rubber 5 which is located near the sidewall portion and $h_2$ a height of the top end of the turn-up portion 1b. Since the carcass material is arranged at the tension side of the tire and the rubber member is arranged at the compression side of the tire, it is preferable to determine the values of $h_1$ and $h_2$ by the following formulae $$0 < h_1 \leq \tfrac{1}{4} l$$

$$\tfrac{1}{4} l \leq h_2$$

Figure 2:
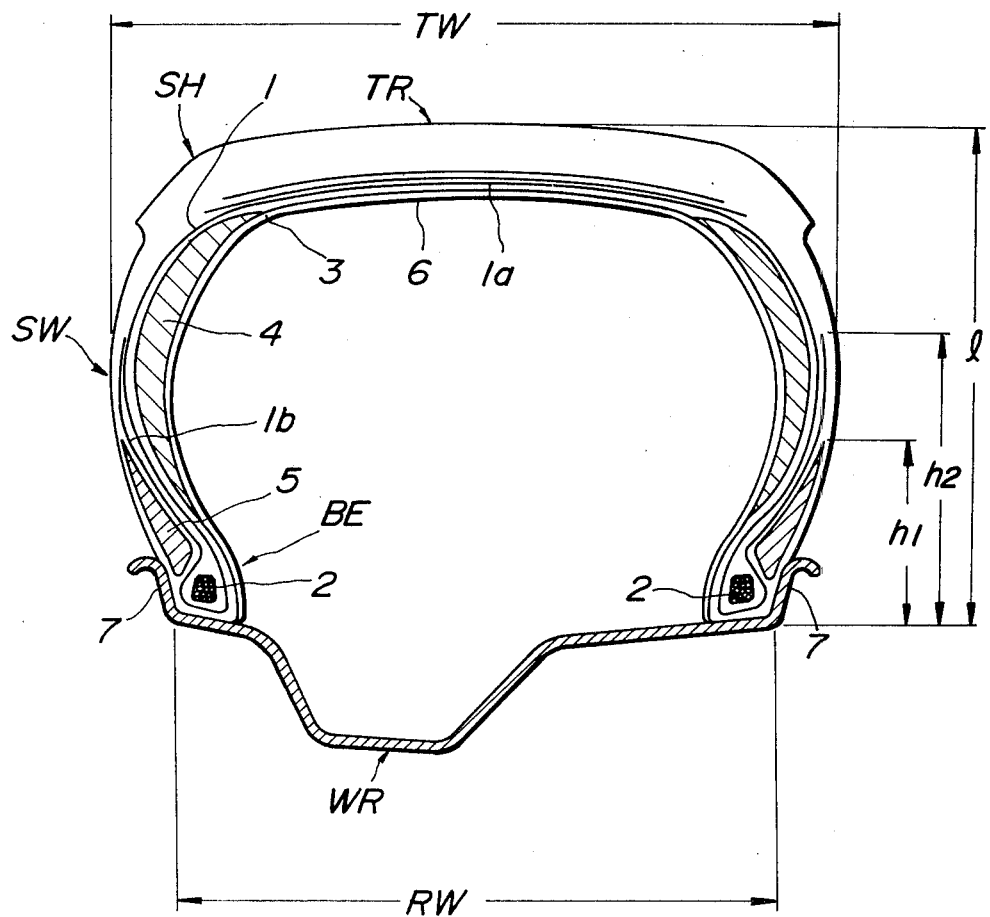
FIG. 2 is a diagrammatic cross sectional view of another embodiment of a safety pneumatic tire according to the invention.

FIG. 2 shows another embodiment of a safety pneumatic tire according to the invention in section. In the FIG. 2 embodiment, the turn-up portion 1b of the carcass ply 1a, wound around the bead wire 2 from the inside toward the outside thereof, closely adhere to and extends along the outside surface of the carcass ply 1a without inserting the bead filler rubber 5 therebetween. The use of such measure ensures a further improvement in resistance to puncture of the tire.

Experimental tests on change in the tire configuration have shown the following result.

(A) Construction of the tire to be tested:

| Construction | The construction shown in FIG. 1. |
|---|---|
| Annular resilient reinforcing body | |
| Hardness | JIS 75° |
| Resilient modulus of elasticity | 75% |
| 100% modulus | 70 kg/cm² |
| Inner liner | NR/Cl-IIR = 40/60 |
| Carcass ply | |
| Material | Nylon 1,260 denier 2 strands |
| Number of plies | 1 |
| Height of the top end of the turn-up portion | 80 mm |

(B) Kind of tire to be tested:

| Outer diameter | 633 mm |
|---|---|
| Tire maximum width | 198 to 215 mm (5 kinds) |

(C) Test condition:

| Rim width | 152.4 mm (6 inch) and 165.1 mm (6.5 inch) |
|---|---|
| Tire internal pressure | 0 kg/cm² (valve core removed) |
| Load | 275 kg |
| Speed | 80 km/H |
| Indoor drum | |

(D) Test result:

| | Kind A | B | C | D | E |
|---|---|---|---|---|---|
| Outer diameter | 633mm | 633mm | 633mm | 633mm | 633mm |
| Tire maximum width | 198mm | 206mm | 215mm | 206mm | 214mm |
| Rim width | 165.1mm | 165.1mm | 165.1mm | 152.4mm | 152.4mm |
| Maximum width / Rim width | 1.20 | 1.25 | 1.30 | 1.35 | 1.40 |
| Puncture durability 4.5% reinforcement | 500km | 460km | 400km | 150km | 100km |
| Puncture durability 3% reinforcement | — | 20km | — | — | 10km |

In the above test result, 4.5% reinforcement and 3% reinforcement shall be understood to mean that the maximum thickness of the annular resilient reinforcing body is 4.5% and 3% of the tire maximum width, respectively.

Figure 3:
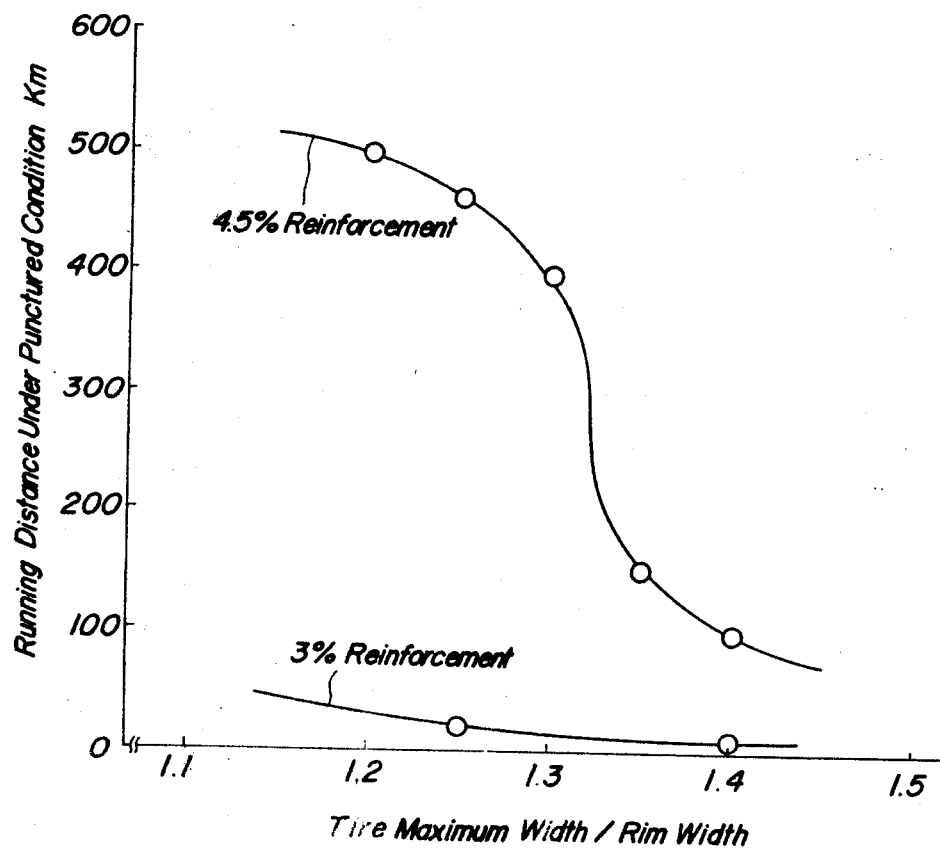
FIG. 3 is a graph showing an experimental test result on tires built in accordance with the invention.

FIG. 3 shows a graph showing the above mentioned test result. As seen from FIG. 3, in the case of the 3% reinforcement, the annular resilient reinforcing body becomes mechanically collapsed when it is bent, and as a result, the tire with the 3% reinforcement has no puncture durability. Thus, the tire has substantially no change in the running distances under punctured condition as a function of the change in the tire configuration, that is, the change in the ratio of the tire maximum width/rim width. On the contrary, in the case of the 4.5% reinforcement, the running distance under punctured condition becomes remarkably high as a function of the change in the tire configuration and becomes significantly high when the ratio of the tire maximum width/rim width is smaller than 1.3

Experimental tests on the tire of the above mentioned tire B constructed such that the turn-up portion of the carcass ply is located inside the bead filter rubber have demonstrated that the puncture durability becomes significantly improved and that in the above mentioned test result the puncture durability of 460 km is increased to 1,500 km.

As stated hereinbefore, the safety pneumatic tire according to the invention is capable of not only maintaining the rolling resistance which is the same as that of the ordinary tire when the tire is inflated by the normal internal pressure and is used under the normal running condition, but also significantly improving the run flat characteristic under a punctured condition.

What is claimed is:

1. A safety pneumatic tire comprising at least one toroidal-shaped carcass ply composed of a rubberized cord layer, a pair of bead portions each including a bead wire, each having an end of said carcass ply wound around from the inside toward the outside thereof to form a turn-up portion; a pair of sidewall portions each connected to each bead portion; a tread portion extending across both said sidewall portions; an annular resilient reinforcing body extending along a total curved region from a position where the thickness of said bead portion becomes thin toward said sidewall portion to a hump position where the thickness at the shoulder of said tread portion is the largest, said annular resilient reinforcing body having a maximum thickness corresponding to 4 to 9% of the tire maximum width, said annular resilient reinforcing body gradually decreasing in thickness toward both said bead portion and said hump position, the total thickness of said annular resilient reinforcing body and said sidewall portion being substantially equal and continuous in the radial direction of the tire, said annular resilient reinforcing body having a JIS hardness of at least 60°; and a ratio of the tire maximum width TW of said safety pneumatic tire mounted on a wheel rim and inflated under a given internal pressure applied in the tire to the rim width RW within a range given by $1.0 \leq TW/RW \leq 1.3$.

2. The safety pneumatic tire according to claim 1, wherein between said carcass ply and said turn-up portion thereof is inserted a bead filler rubber formed of a hard rubber stock and gradually thin in thickness toward said sidewall portion.

3. The safety pneumatic tire according to claim 2, wherein said bead filler rubber has a height $h_1$ given by $0 < h_1 \leq \frac{1}{3} l$, where $l$ is a height of the tire.

4. The safety pneumatic tire according to claim 1, wherein said turn-up portion is substantially closely adhered to said carcass ply at a position opposed to the flange position of said wheel rim and extends along the side surface of said carcass ply.

5. The safety pneumatic tire according to claim 1, wherein the top end of said turn-up portion is located at a position which is higher than the tire maximum width position.

6. The safety pneumatic tire according to claim 1, wherein said turn-up portion has a height $h_2$ given by $\frac{1}{2} l \leq h_2$ where $l$ is a height of the tire.

* * * * *